April 9, 1963 R. D. LEFEBVRE ET AL 3,084,703

SHELTER

Filed Aug. 8, 1960

INVENTOR.
REINE D. LEFEBVRE
PAUL A. LEFEBVRE
BY
ATTORNEYS.

United States Patent Office 3,084,703
Patented Apr. 9, 1963

3,084,703
SHELTER
Reine D. Lefebvre and Paul A. Lefebvre, both of 2040 Lewis, Altadena, Calif.
Filed Aug. 8, 1960, Ser. No. 48,188
6 Claims. (Cl. 135—1)

This invention relates to a shelter-type accessory useful as an awning or as an extra-room device.

This invention comprises an accessory which, while of general utility in providing shelter, finds its principal use in connection with mobile trailers. It has as its object to provide a simple structure capable of providing either an overhead awning, or, alternatively, a room structure having side enclosures which may include windows and doors as desired.

A trailer room accessory according to this invention comprises an upper support means adapted to be attached to a wall, such as a trailer wall, at an upper elevation. To this upper support means there are attached a plurality of roof supports which depart from the wall, and are connected at points spaced from the wall to a transverse edge support. These supports are sustained by posts which rest on the ground. Two of the roof supports, and the transverse edge support, provide structural definition for three edges of the room or awning.

A roof sheet is connected to the upper support means and overlaps said three edges to form a roof. An upper siding sheet is attached to the roof sheet at all three of its edges and has a lower boundary that extends continuously beneath all three edges in substantially a single plane. This boundary is disposed below all three edges, and the roof sheet and the upper siding sheet thereby form an awning.

A lower siding sheet extends beneath all three edges immediately beneath and adjacent to the upper siding sheet and means, preferably a zipper, detachably joins the upper and lower siding sheets so that the lower siding sheet can enclose the area beneath the roof sheet and form a weather-tight room. The floor sheet has dimensions such as to underlie the entirety of the roof sheet. When the device is used as an additional room next to a trailer, where there is a spacing between the trailer wall and the ground, a filler sheet can be provided which adjoins the edge of the floor sheet and the trailer for sealing this region.

Attach means, preferably a zipper, can be provided for joining the lower edge of the lower siding sheet to the floor sheet.

The above and other features of this invention will be fully understood from the following detailed description and the accompanying drawings, in which:

FIG. 1 is a perspective view showing an accessory according to the invention erected next to a trailer;

FIG. 2 is a left-hand view of FIG. 1 taken just inside the fabric cover;

FIG. 3 is a view of supporting structure taken at line 3—3 of FIG. 2;

FIG. 4 is a right-hand end view of FIG. 1; and

FIG. 5 is a fragmentary cross-section taken at line 5—5 of FIG. 4.

In FIG. 1 there is shown a trailer 10 having a wall 11 adjacent to which the accessory 12 according to this invention is mounted. It will be understood that although wall 11 is shown as solid and imperforate, there might be a door or a window in it offering either complete or limited ingress and egress to the accessory as desired, and it is one of the advantages of this invention that such access is possible if it is desired to have it. Furthermore, this accessory can be mounted to walls other than trailer walls, wherever an awning or room is desired, so that, although the embodiment shown has portions which make it particularly suitable for use with a trailer, this use is not a limitation on the invention.

To wall 11 there is mounted an upper support means 13. This means most conveniently comprises an angle 14 which is fixed to the trailer, and runs transversely along its wall, or whatever other wall is used. Rising from flange 15 of this angle, there are three studs 16, 17, 18.

Three roof supports 19, 20, 21 are connected one to each of studs 16, 17, 18, and incline downwardly away from the upper support means. These roof supports are all typified by support 19 (FIG. 2). It has flanges on each end and there is an aperture 24, 25 through each. Each support is telescopic, including an outer tube 26 and an inner tube 27. A spring-loaded detent 28 is provided for holding the tubes in the illustrated extended position. It is pressed in to enable the support to be diminished in length by moving the inner tube telescopically into the outer tube for storage purposes. In FIG. 2, the support is shown in its extended configuration.

A transverse edge support 30 extends horizontally along the ends of roof supports 19, 20, 21. It has an aperture 40, 42 on each of its ends, and another aperture 41 in the center. Three posts 31, 32, 33 are provided beneath the transverse edge support. Locating studs 34, 35 and 36 are provided at the upper end, and stakes 37, 38, 39 are provided at the lower end of posts 31, 32, 33, respectively. The locating studs pass upwardly (see FIG. 2) through the apertures in the free ends of the roof supports and through apertures 40, 41, 42 in the transverse edge support. The stakes are inserted in the ground for locating the bottoms of the posts. It will now be seen that structural integrity is provided in the form of a framework for an outer fabric cover. To minimize sway, tie ropes 43, 44 may be looped over the locating stud of post 31 and stake of post 33, and another over the locating stud of post 33 and under the stake of post 31.

The transverse edge support and the posts are telescopic in the same manner as the roof supports.

A roof sheet 45 is provided with three grommeted apertures 46, 47, 48 which are placed over studs 16, 17, 18 at the upper support means to locate the upper edge of the roof next to the trailer. The roof sheet overlaps flange 15 to shut out the weather. The roof sheet extends along and interconnects edges 49, 50, 51 which edges are defined by the roof supports and transverse edge support. The roof sheet is further provided with grommeted apertures 52, 53, 54 which are passed over locating studs 34, 35, 36, respectively, of the posts, thereby locating and stretching the roof sheet.

An upper siding sheet 57 is sewed to the roof sheet at edges 49, 50, 51, extending a distance beneath these edges so as to provide awning overhangs 58, 59, 60. The roof sheet and overhangs provide an awning-type shade. A lower siding sheet 61 provides a three wall surfaces 62, 63, 64. This lower siding sheet is preferably a continuous sheet, which may be stitched up from a number of smaller pieces, if more convenient. A zipper 65 has one of its parts attached to the lower boundary of the upper siding sheet, and its other part fixed to the upper boundary of the lower siding sheet. The sheet provides means for joining the siding sheets.

A floor sheet 70 underlies the roof sheet, though in a non-parallel plane. It is provided with three grommeted apertures 71, 72, 73 through which the post stakes pass to locate the edge of the floor farthest from the wall. One part of a zipper 74 is attached to the lower boundary of the lower siding sheet and the other part is attached to edges 75, 76, 77 of the floor sheet. By joining the zipper, the lower siding sheet can be detachably secured to the floor sheet. It will now be seen that the wall surfaces can be readily installed merely by joining the parts of zippers 65 and 74.

Means are provided for holding the edges of the upper and lower siding sheets to the trailer wall to give privacy and exclude the weather. These means comprise a drawstring 80 in hemmed edge 81 of the upper siding sheet and drawstring 82 in hemmed edge 83 of the lower siding sheet. Ends 84, 85 of drawstrings 80 and 82 may be tied together when the lower siding sheet is used, the other end of drawstring 80 being fixed to the upper support member or some other stationary structure. End 86 can be pulled and attached to some structure, such as a stake (not shown), to hold the edges snugly to the wall. Edges 87, 88 are both provided with such drawstrings. When the lower siding sheet is not used, end 84 can be attached to a stud or some other structure on the wall to keep the edge from flapping, if desired.

When this device is used with a trailer, there will, of course, be a spacing between the bottom of the trailer wall and the ground. To exclude the weather at this space, a filler sheet 90 is provided. This filler sheet is attached by means such as snaps 91 to the floor sheet and by buttons 92 to the trailer wall. Ordinarily, the filler sheet will fit underneath the floor sheets so as to exclude dirt and dust most effectively, and will rise about two or three feet from the ground to be buttoned to the trailer. The filler sheet may be attached by additional buttons to the lower portion of the lower siding sheet at edges 87 and 88.

In order to provide ingress, egress, light, and air for this accessory when it is used as a room, the lower siding sheets have screened openings. FIG. 4 shows wall surface 64 which is equipped with a window 95 and a door 96. The door is shown in detail in FIG. 5. There is a rectangular aperture 97 formed in the lower siding sheet at this location, and two abutting sheets of mesh 98, 99 fill the aperture. Each has three of its sides sewed to the siding sheet. The free sides abut, and carry a zipper 100 by means of which the screening can be opened or closed from either the inside or the outside of the room.

The door also includes a pair of opaque panels 101, 102 which have their upper and vertical edges sewed to the lower siding sheet and their lower ends loose. A zipper 103 joins the opaque panels at their vertical free ends to close them for privacy, or open them for egress and ingress. In FIG. 5, the solid line shows the door closed, and the phantom line shows the door opened.

A window is shown in FIG. 4 in wall surface 64. The window comprises an aperture 105 in the lower siding sheet which is filled with a sheet of mesh 106 which may or may not have a zipper up its center to allow a person to reach through it. An opaque panel 107 can be sewed to the top of the aperture and may be rolled up and down as desired. When it is used, a center zipper will be provided so that the panel can be rolled up and down from inside. Ties 108 hold the panel in its rolled up condition. If desired, zippers may be provided around edges 109, 110, 111 of the opaque panel to hold it closed for maximum privacy.

Wall surface 63 is made substantially an entire window if desired. It has an aperture 112 which is filled with a mesh 113 and is covered with an opaque panel 114 which may be rolled up and held by ties 115. Edges 116, 117, 118 can be provided with zippers to hold down the panel for maximum privacy.

Wall surface 62 has a window formed in an aperture 120 filled with two mesh panels 121, 122. These panels have three of their edges sewed to the lower siding sheet, and have their abutting edges by zipper 123. An opaque panel 124 is sewed to the upper edge of the aperture and may be rolled up or down. Ties 125 are provided for holding the panel in a rolled up position. For maximum privacy, side flaps 126, 127 are sewed to the aperture at the vertical edges thereof to overlap the opaque panel when it is down. Zippers are provided at edges 128, 129 of the opaque panel to hold it down.

It will be seen that this invention provides an easily erected and easily dismounted framework and fabric covering which is adapted either for service as an awning or as an auxiliary accessory room for a trailer or other adjoining structure. It is provided with convenient means for egress and ingress, which means are adequately screened against insects, as are windows for light, air, and accessibility. The room is entirely floored and has means for sealing all open spaces, such that the room can be set up in substantially any environment to provide a livable and comfortable structure.

This invention is not to be limited by the embodiments shown in the drawings and described in the description which are given by way of example and not of limitation, but only in accordance with the scope of the appended claims.

What is claimed is:

1. A shelter accessory for abutting to a wall comprising: an upper support means adapted to be attached to the wall at an elevation; a plurality of roof supports attached to the upper support means and inclining downwardly and away from the wall; a transverse edge support; a plurality of posts, said roof supports, transverse edge support, and posts all being joined together whereby two of the roof supports, together with the transverse edge support, provide structural definition for three edges of the accessory; a roof sheet connected to the upper support means and overlapping said three edges to form a roof; an upper siding sheet attached to said roof sheet at all three of said edges and having a lower boundary extending beneath all three edges in substantially a single plane, said boundary being disposed below all three edges to form an awning; a lower siding sheet extending beneath all three edges immediately beneath the upper siding sheet; first attach means detachably joining the upper and lower siding sheets, the lower siding sheet being of such dimensions that it reaches from the lower boundary of the upper siding sheet to the ground to form a removable wall; and a floor sheet underlying the roof sheet; second attach means detachably joining the floor sheet and lower siding sheets whereby with the supports and posts assembled and the roof sheet and upper siding sheet placed atop them, an awning is formed, and with the lower siding sheet attached to the lower boundary of the upper siding sheet, a room is formed; drawstrings extending along the edges of the upper and lower siding sheet adjacent to the wall so that they may be tied to each other at their ends at the boundary between the siding sheets, and to stationary structure at the other ends so as to draw said edges tightly against the wall.

2. A shelter accessory for abutting to a wall comprising: an upper support means comprising a plurality of studs adapted to be attached to the wall at an elevation; a plurality of roof supports attached to the upper support means and inclining downwardly and away from the wall; a transverse edge support; a plurality of posts, said roof supports, transverse edge support, and posts all being joined together whereby two of the roof supports, together with the transverse edge support, provide structural definition for three edges of the accessory; a roof sheet connected to the upper support means and overlapping said three edges to form a roof, the support means being adapted to pass through the roof sheet to engage it; an upper siding sheet attached to said roof sheet at all three of said edges and having a lower boundary extending beneath all three edges in substantially a single plane, said boundary being disposed below all three edges to form an awning; a lower siding sheet extending beneath all three edges immediately beneath the upper siding sheet; first attach means detachably joining the upper and lower siding sheets, the lower siding sheet being of such dimensions that it reaches from the lower boundary of the upper siding sheet to the ground to form a removable wall; and a floor sheet underlying the roof sheet; second attach means detachably joining the floor sheet and lower siding sheets, whereby with the supports and posts asembled and the roof sheet and upper siding sheet placed atop them, an awning is formed, and with the lower siding sheet attached to the lower boundary of the upper siding sheet, a room is formed, the roof supports transverse edge support and posts being telescopic structures adapted to be reduced in length for storage and extended in length for use.

3. A shelter accessory according to claim 2 in which the posts have projecting locating studs and the roof supports, transverse edge support, and roof sheet have apertures through which the locating studs pass to locate and fix the sheets relative to the supports.

4. A shelter accessory according to claim 3 in which the posts each have a stake in the end opposite from that having the locating stud for passage through apertures in the floor sheet and lower side sheets for locating the post, a floor sheet, and lower side sheet.

5. A shelter accessory for a trailer having an outer wall comprising: an upper support means adapted to be attached to a wall at an upper elevation comprising a plurality of studs adapted to pass through grommeted apertures; a plurality of telescopic roof supports, one end of each of which is attachable to the upper support means and which roof supports incline downwardly and away from the wall; a telescopic transverse edge support; a plurality of telescopic posts, said roof supports, transverse edge support, and posts all being joined together, whereby two of the roof supports together with the transverse edge support provide structural definitition for three edges of a shelter; locating studs on the posts adapted to pass through apertures in the transverse edge support and roof supports and through grommeted apertures in a roof sheet to hold these elements in place; sway bracing between a plurality of said posts; a roof sheet connected to the upper support means and overlapping said three edges to form a roof, said roof sheet having a plurality of grommeted apertures adapted to fit on the studs; an upper siding sheet attached to said roof sheet at all three of said edges and having a lower boundary extending beneath all three edges in substantially a single plane, said boundary being disposed below all three edges to form a side awning; a lower siding sheet extending beneath all three edges immediately beneath the upper siding sheet; a zipper extending along said lower boundary and adapted to detachably join the upper and lower siding sheets, the lower siding sheet being of such dimensions that it reaches from the lower boundary of the upper siding sheet to the ground to form a removable wall; a floor sheet having dimensions such as to underlay substantially the entirety of the roof sheet; a zipper attaching the lower boundary of the lower siding sheet to three sides of the roof sheet; a filler sheet adapted to be attached to the edge of the floor sheet adjacent the wall and to the wall for closing any opening between the ground and the wall; drawstrings in the edges of the upper and lower sealing sheets adjacent to the wall adapted to be drawn tight and staked to the ground so as to hold these edges snugly against the wall; and a door and a window in said lower side sheet.

6. A shelter accessory according to claim 5 in which the window comprises an aperture through the lower siding sheet, a mesh screen filling said aperture, and an opaque panel sewed to one edge of said aperture for covering the same, and in which the door comprises an aperture through the lower siding sheet, a pair of rectangular mesh panels, each of which is sewed at three of its edges in said aperture, the other edges abutting each other, and in which a zipper is provided for joining said mesh panels, and in which a pair of rectangular opaque panels are provided having two of their edges sewed to said aperture, and one edge of each in abutment with the other, and in which a zipper is provided for joining the abutting edges.

References Cited in the file of this patent

UNITED STATES PATENTS

| | | |
|---|---|---|
| 1,629,362 | Robert | May 17, 1927 |
| 1,825,183 | Frisby | Sept. 29, 1931 |
| 1,828,656 | Handler | Oct. 20, 1931 |
| 2,345,377 | Bowen | Mar. 28, 1944 |
| 2,788,791 | Pospisil et al. | Apr. 16, 1957 |
| 2,793,646 | Lefebvre | May 28, 1957 |
| 2,808,065 | Ellis | Oct. 1, 1957 |
| 2,957,483 | Dunn | Oct. 25, 1960 |
| 3,020,919 | Crump | Feb. 13, 1962 |
| 3,025,866 | Cockrum | Mar. 20, 1962 |